US012567279B2

(12) United States Patent
Lodewyckx et al.

(10) Patent No.: US 12,567,279 B2
(45) Date of Patent: *Mar. 3, 2026

(54) METHODS AND APPARATUS FOR INSPECTING AND SORTING

(71) Applicant: KEY TECHNOLOGY, INC., Walla Walla, WA (US)

(72) Inventors: Peter Lodewyckx, Meensel-Kiezegem (BE); Marc Van Daele, Diepenbeek (BE); Timothy Justice, Walla Walla, WA (US)

(73) Assignee: Key Technology, Inc, Walla Walla, WA (US)

(*) Notice: Subject to any disclaimer, the term of this patent is extended or adjusted under 35 U.S.C. 154(b) by 0 days.

This patent is subject to a terminal disclaimer.

(21) Appl. No.: 18/645,068

(22) Filed: Apr. 24, 2024

(65) Prior Publication Data

US 2024/0321001 A1    Sep. 26, 2024

Related U.S. Application Data

(63) Continuation of application No. 17/742,069, filed on May 11, 2022, now Pat. No. 11,995,912, which is a
(Continued)

(51) Int. Cl.
*G06V 40/12* (2022.01)
*G06T 7/00* (2017.01)
(Continued)

(52) U.S. Cl.
CPC ........ *G06V 40/1335* (2022.01); *G06T 7/0004* (2013.01); *G06T 7/596* (2017.01);
(Continued)

(58) Field of Classification Search
None
See application file for complete search history.

(56) References Cited

U.S. PATENT DOCUMENTS 5,431,289 A    7/1995  Hoffman
6,959,108 B1  10/2005  Bartelt
(Continued)

FOREIGN PATENT DOCUMENTS

WO    2019055102 A1    3/2019

OTHER PUBLICATIONS

Wang, Shaohu, et al. "Hierarchical viewpoint planning for complex surfaces in industrial product inspection." IEEE/ASME Transactions on Mechatronics 29.5 (2023): 3289-3299. (Year: 2023).*
(Continued)

*Primary Examiner* — Michelle M Entezari Hausmann
(74) *Attorney, Agent, or Firm* — Randall Danskin P.S.

(57)    ABSTRACT

A method and apparatus for sorting is described, and which includes providing a product stream formed of individual objects of interest having feature aspects which can be detected; generating multiple images of each of the respective objects of interest; classifying the feature aspects of the objects of interest; identifying complementary images by analyzing some of the multiplicity of images; fusing the complementary images to form an aggregated region representation of the complementary images; and sorting the respective objects of interest based at least in part upon the aggregated region representation which is formed.

20 Claims, 4 Drawing Sheets

Related U.S. Application Data continuation of application No. 16/828,669, filed on Mar. 24, 2020, now Pat. No. 11,334,741, which is a continuation of application No. PCT/US2018/039749, filed on Jun. 27, 2018, and a continuation of application No. 15/706,055, filed on Sep. 15, 2017, now Pat. No. 10,621,406.

(51) Int. Cl.

| | |
|---|---|
| *G06T 7/593* | (2017.01) |
| *G06T 7/80* | (2017.01) |
| *G06T 15/00* | (2011.01) |
| *G06V 20/52* | (2022.01) |

(52) U.S. Cl.

CPC .............. *G06T 7/85* (2017.01); *G06T 15/005* (2013.01); *G06V 20/52* (2022.01); *G06T 2207/10021* (2013.01); *G06T 2207/20221* (2013.01); *G06T 2207/30128* (2013.01); *G06V 2201/06* (2022.01)

(56) References Cited

U.S. PATENT DOCUMENTS

| | | | |
|---|---|---|---|
| 7,340,084 | B2 | 3/2008 | Hamid |
| 8,379,014 | B2* | 2/2013 | Wiedemann ....... G06V 30/1914 |
| | | | 345/428 |
| 8,406,919 | B1 | 3/2013 | Hill et al. |
| 8,525,836 | B1* | 9/2013 | Poursohi ................. H04L 67/10 |
| | | | 345/611 |
| 9,146,190 | B2 | 9/2015 | Hug |
| 9,165,375 | B2 | 10/2015 | Datta |
| 9,251,624 | B2* | 2/2016 | Ito ........................... G06T 17/00 |
| 9,266,148 | B2 | 2/2016 | Adams et al. |
| 9,517,491 | B2 | 12/2016 | Adams et al. |
| 9,520,040 | B2 | 12/2016 | Mavromatis |
| 9,573,168 | B2 | 2/2017 | Adams et al. |
| 9,805,255 | B2 | 10/2017 | Yang |
| 10,163,256 | B2 | 12/2018 | Benedek |
| 10,478,862 | B2 | 11/2019 | Justice |
| 2004/0199292 | A1 | 10/2004 | Sakagami |
| 2006/0013507 | A1 | 1/2006 | Kaneko et al. |
| 2006/0232679 | A1 | 10/2006 | Kurosawa et al. |
| 2007/0237420 | A1 | 10/2007 | Steedly et al. |
| 2008/0233523 | A1 | 9/2008 | Diepenbroek |
| 2009/0245573 | A1 | 10/2009 | Saptharishi |
| 2010/0104216 | A1 | 4/2010 | Ge |
| 2010/0111359 | A1 | 5/2010 | Bai |
| 2010/0157020 | A1 | 6/2010 | Choi et al. |
| 2010/0194851 | A1 | 8/2010 | Pasupaleti et al. |
| 2010/0286827 | A1 | 11/2010 | Franzius |
| 2010/0303337 | A1* | 12/2010 | Wallack ................ B25J 9/1697 |
| | | | 348/47 |
| 2011/0037997 | A1 | 2/2011 | Karszes |
| 2013/0021379 | A1* | 1/2013 | Sirpal ................... G06F 3/0483 |
| | | | 345/659 |
| 2014/0003511 | A1* | 1/2014 | Shimizu ................. H04N 19/96 |
| | | | 375/240.12 |
| 2014/0147015 | A1 | 5/2014 | Bajema |
| 2014/0185874 | A1 | 7/2014 | Li |
| 2014/0333755 | A1 | 11/2014 | Adams |
| 2017/0150129 | A1* | 5/2017 | Pangrazio ............ H04N 13/239 |
| 2018/0113083 | A1 | 4/2018 | Van Dael |
| 2021/0121922 | A1 | 4/2021 | Schmidt |
| 2021/0379624 | A1* | 12/2021 | Lu ........................... B07C 5/342 |

OTHER PUBLICATIONS

Fan W, Chen Z, Luo Z, Guo B. An aggregate gradation detection method based on multi-view information fusion. Powder Technology. Aug. 1, 2021;388:7-16. (Year: 2021).*

Luo, Ren C., and Michael G. Kay, "Multisensor integration and fusion in intelligent systems."; IEEE Transactions on Systems, Man, and Cybemetics; 19.5 (1989): 901-931. (Year: 1989).

International Search Report and Written Opinion of International Search Authority for PCT/US2018/039749, dated Sep. 21, 2018.

Maier, Georg, "Motion based visual inspection of optically indiscernible defects on the example of hazelnuts."; Computers and Electronics in Agriculture; 185 (2021).

Pearson, T, Moore D, Pearson J., "A machine vision system for high speed sorting of small spots on grains"; Journal of Food Measurement & Characterization (2012).

Maier, Georg, et al. "Experimental evaluation of a novel sensor-based sorting approach featuring predictive real-time multiobject tracking." IEEE Transactions on Industrial Electronics 68.2 (2020): 1548-1559. (Year: 2020).

Nazeri, A, Plociennik, C., Vogelgesang, M., Li, C. and Ruskowski, M., 2023. A Novel Approach for Sensor Fusion Object Detection in Waste Sorting: The Case of WEEE. (Year: 2023).

Zareiforoush H, Minaei S, Alizadeh MR, Banakar A. Potential applications of computer vision in quality inspection of rice: a review. Food engineering reviews. Sep. 2015;7:321-45. (Year: 2015).

* cited by examiner

METHODS AND APPARATUS FOR INSPECTING AND SORTING

RELATED APPLICATIONS

This application is a continuation application of, and claims priority to, co-pending U.S. patent application Ser. No. 17/742,069, filed May 11, 2022, entitled "Apparatus for Inspecting and Sorting," for which a Notice of Allowance (NOA) has been issued by the USPTO and which is fully and completely incorporated herein by reference (the "CON2" patent application). The CON2 application is a continuation application of, and this continuation application claims priority to, U.S. patent application Ser. No. 16/828,669, filed Mar. 24, 2020, entitled "Method and Apparatus for Inspecting and Sorting," for which U.S. Pat. No. 11,334,741 has been issued by the USPTO and which is fully and completely incorporated herein by reference (the "CON1" patent application). The CON1 patent application is a continuation of, and this continuation patent application claims priority to, earlier filed international application PCT/US2018/039749 filed on Jun. 27, 2018 and U.S. Pat. No. 10,621,406 filed on Sep. 15, 2017, which are fully and completely incorporated herein by reference (the "Parent" patent applications).

The inventorship of this continuation patent application is the same as the inventorship of the above-referenced co-pending CON2 and of the above-referenced CON1 and Parent patent applications, each to which this continuation application claims priority.

TECHNICAL FIELD

The present invention relates to methods and apparatus for inspecting and sorting, and more specifically to a method and apparatus, which when implemented, generates increasingly accurate object measurements which are utilized in the preparation of sorting statistics, and which further increases the accuracy of the sorting decision made by high-speed, mass-flow food sorting devices or various designs.

BACKGROUND OF THE INVENTION

In U.S. Pat. No. 9,517,491 a method and apparatus for sorting was described, and wherein real-time sorting decisions are accomplished by means of an arrangement which allowed for the selective actuating of detection devices in a predetermined order, and in real-time, so as to prevent interference in the operation of the respective, selectively actuated detection devices, and thereafter delivering detection device signals to an appropriately positioned ejection device, and which is effective in removing a defective or undesirable object from a stream of products which are being sorted. The disclosed invention permits objects or products having defects to be removed from a product stream in a particularly advantageous manner which was not possible, heretofore. The method and apparatus, as described in the previous patent, allows an associated controller, to build a multi-dimensioned feature space having multiple levels or types of sorting information which facilitates an overall increased accuracy in the resulting sorting decisions made by the mass-flow sorting device.

While the method and apparatus as described in the aforementioned U.S. patent, and other related patents, have worked with a great deal of success, developers of this same technology have continued to conduct further research to uncover other means by which such sorting machines, or similar devices, may generate increasingly accurate sorting statistics, and/or other meaningful user information, in order to enhance the ability of such sorting devices to accurately sort a stream of objects, such as food products, or perform desired sorting functions so as to permit an end-user to supply different grades of products to a customer. Further the present invention as described, hereinafter, permits sorting decisions to be made at an earlier point in time, in the sorting process, and where identified undesirable objects, or defective products can be effectively removed from a product stream, before the product or object reaches a location where the identified undesirable object or defective product cannot be acted upon by an appropriately oriented ejector. In short, the methodology, as described, hereinafter, allows for a real-time ejection or removal of an undesirable object or defective product to take place based, in whole or in part, upon partial object data, or other information which has been collected from the product stream by the methodology as described, hereinafter. This type of sorting has not been possible, heretofore, with existing, commercially available, technology.

A method and apparatus for inspecting and sorting which avoids the detriments associated with various prior art teachings and practices utilized, heretofore, is the subject matter of the present application.

SUMMARY OF THE INVENTION

A first aspect of the present invention relates to the method of sorting which includes providing a product stream formed of individual objects of interest each having one or more feature aspects which can be detected; generating multiple images each having different perspectives of the respective objects of interest having the detectable feature aspects; classifying the aforementioned feature aspects of each of the objects of interest as being either a parent or a child feature; identifying a complementary region of the images or views of the respective objects of interest by analyzing at least some of the previously identified parent and/or child features identified in some of the multiplicity of images or views; fusing the complementary regions of the images or views which are identified so as to form a resulting aggregated region representation of each of the objects of interest; and sorting the respective objects of interest based, at least in part, upon the aggregated region representations which are formed.

Still another aspect of the present invention relates to a method of sorting which includes the steps of providing a product stream formed of individual objects of interest which each have multiple sides; moving the product stream along a predetermined path of travel, and which has a path portion which permits the viewing of the multiple sides of each of the objects of interest moving in the product stream; providing a plurality of detection devices, and positioning the respective detection devices at individual, different perspectives, and a given, known position, and wherein each of the respective detection devices have a predetermined field of view relative to the path portion of the product stream, and wherein the respective detection devices, when actuated, generate a device signal; providing a controller for selectively actuating the respective detection devices in a predetermined order (that is, either substantially simultaneously and/or sequentially in a given time period), and in real-time, so as to selectively synchronize the operation of the respective detection devices; actuating the respective detection devices with the controller, in real-time, so as to enhance the operation of the respective detection devices which are actuated, and wherein the device signals of the plurality of the detection devices comprise, at least in part, individual images or views of multiple, different perspectives of the respective objects of interest moving along in the path portion of the product stream, and delivering the respective device signals to the controller; acquiring multiple, different, perspective images or views from the selectively actuated, and synchronized detection devices; detecting the respective objects of interest relative to a background signal which is recognized, and present within, each of the perspective images which have been acquired; discriminating one or more feature aspects of the individual objects of interest from within each of the different, perspective images or views which have been acquired; classifying the respective feature aspects of the individual objects of interest into either a parent, or a child feature class from each of the different perspective images or views; associating a set of parent features acquired from different perspective images or views based, at least in part, upon one or more of a group of factors selected from the group comprising the individual object of interest's position; size; shape; orientation; and classification within each of the different perspective images or views acquired; calculating a given region such as a contour and/or bounding box surrounding the set of parent features based, at least in part, upon one or more of a group of factors selected from the group comprising the size; shape; and orientation of the parent feature; identifying one or more of the child feature, of each parent feature, within the given region; associating one or more sets of child features within each given region based, at least in part, upon one or more of a group of factors comprising the location of the one or more child features within the surrounding, given region; the size of the one or more child features; and a classification of the one or more child features; forming an aggregated region representation of the multiple perspectives, or views of the individual objects of interest with the controller, and wherein the aggregated region representation of the individual objects of interest is formed from the multiple perspective images which were derived from the different detection devices, and further forming, with the controller, real-time, multiple-aspect representations, or views, of the individual objects of interest travelling in the product stream by utilizing at least a portion of the device signals generated by at least some of the detection devices, and wherein the multiple-aspect representations or views each have a plurality of features depicting a multitude of characteristics possessed by each of the objects of interest; identifying within each aggregated region all parent and child features; calculating a population of the objects of interest by associating one or more parent and child object features; and sorting the individual objects of interest based, at least in part, upon the aggregated regions formed of the multiple perspectives or views of each of the objects of interest, and the multiple aspect representations or views formed by the controller, in real-time, as the individual objects of interest move along in the product stream.

These and other aspects of the present methodology will be discussed in greater detail hereinafter.

BRIEF DESCRIPTION OF THE DRAWINGS

Preferred embodiments of the invention are described, below, with reference to the following accompany drawings.

DETAILED DESCRIPTION OF THE PREFERRED EMBODIMENTS

Figure 1:
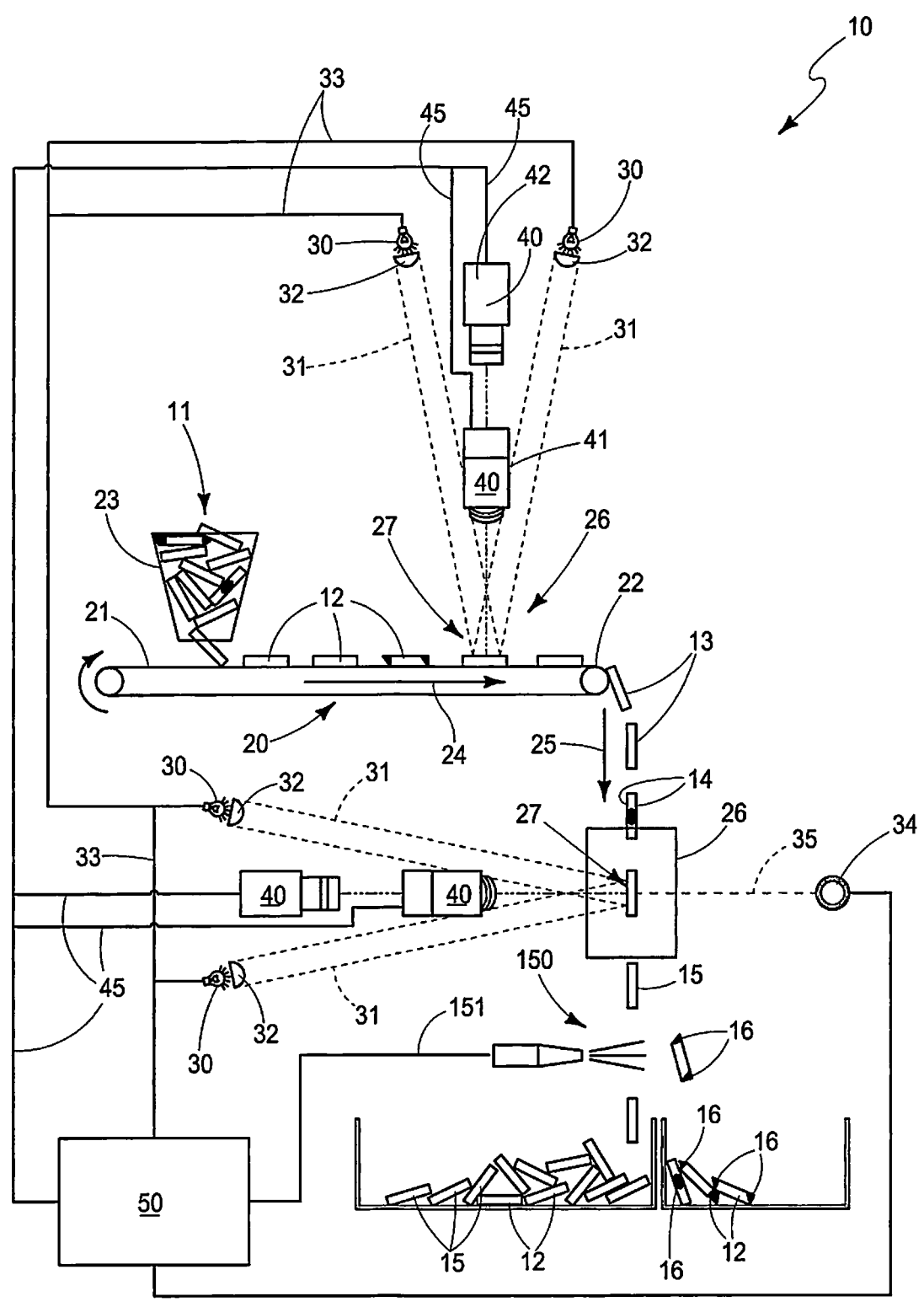
FIG. 1 is a highly simplified view of the overall methodology of the present invention.

This disclosure of the invention is submitted in furtherance of the constitutional purposes of the U.S. Patent Laws "to promote the progress of science and useful arts" (Article 1, Section 8).

As discussed earlier in this application, one of the many problems confronting the developers of high-speed, mass flow, food sorting devices is to collect increasing amounts of information relative to the objects of interest being sorted, and thereafter, by utilizing this information, make accurate sorting decisions to remove undesirable objects and/or products having defects from the product stream which is moving rapidly through a predetermined inspection station, or make other sorting decisions to implement a sorting strategy for a product stream so as to produce different grades of a product for end-user consumption, or further processing. One of the problems which has received increasing amounts of research concerns the propensity for the previously described sorting devices to make inaccurate sorting decisions based, at least in part, upon sensor or other detector information, which identifies the same object defect in the product stream multiple times. As should be appreciated, when an associated controller operates using sensor or detector information which identifies the same defect, multiple times, the controller may cause the sorting device to inappropriately eject an object from a product stream and/or generate inaccurate statistics or information about the product stream, from the multiple sensors and/or detectors when, in fact, only one defect is actually present in the object or product which has been ejected. This so-called "double counting" of defects in an object can result in incorrectly ejected products, and inaccurate sorting statistics. In the food industry these inaccurate ejections of products can result in increased financial losses for a food processor.

Consequently, the production or generation of accurate sorting statistics regarding defects which are seen or detected in the objects of interest which are present in a moving product stream is paramount in maintaining not only the quality of the resulting sorted product, but the profitability for processors which use such high-speed, mass-flow, sorting equipment. As was described with reference to the aforementioned earlier U.S. patent, sorting devices of this level of sophistication or complexity, often employ multiple cameras or other detection devices which, when selectively operated, create resulting data which is then utilized to build or otherwise construct what is termed a "multi-dimensioned feature space" and from which sorting decisions are then made. This "multi-dimensioned feature space" is discussed in detail in U.S. Pat. No. 9,517,491, the teachings of which are incorporated by reference, herein. It is, of course, important to recognize in sorting food products, such as green beans, potato strips (french fries), and the like, that all exterior surfaces (and some interior or hidden surfaces) of the products or objects being sorted may be seen, viewed, or detected by the cameras, or other sensors, and thereafter, a decision must be made by the controller, as provided, as to whether the object, and/or product that has been observed, or detected by the cameras, or other detectors, by utilizing visual or invisible bands of electromagnetic radiation, should be removed from the product stream because it has a defect, or the object which was observed or detected was unacceptable for further processing.

Referring now to the drawings, the method of sorting is generally depicted in the drawings, and is indicated by the numeral 10 in FIG. 1, and following. In this regard the methodology 10 includes a first step of providing a product stream 11 which is formed of individual objects of interest 12. The individual objects of interest 12 each have a main body 13, which is formed of multiple sides 14. As seen in the drawings, the main body 13 may have a feature aspect, portion, or region 15, which is acceptable for further processing. On the other hand, the main body 13 may have an unacceptable feature aspect, defect, region or portion 16, and which renders that portion of the main body 13 unsuitable for further processing. For purposes of the present application, the individual objects of interest 12, are here depicted, as elongated potato strips which have been cut in a fashion for further processing into French fries.

As seen in FIG. 1, the step of providing the product stream 11 includes transporting the product stream by way of a conveyor assembly 20 to an inspection station so that the objects may be individually imaged, as described, below. The conveyor assembly 20 is of traditional design, and has a first, intake end 21, and a second, discharge end 22. While a continuous conveyor belt is illustrated, those skilled in the art will readily recognize that any other traditional conveying device such as an excited-frame vibratory conveyor, or a delivery chute cooperating with such a conveying device or similar arrangement could be employed with equal success. The product stream 11 is delivered to the conveyor assembly 20 by way of a product delivery device 23 which is typically located in a position which is elevationally above, and in product discharging relation relative to, the first intake end 21 of the conveyor. The individual objects of interest 12 then travel to the second, discharge or exhaust end 22 of the conveyor 20, and wherein, upon arriving at this location, the individual objects of interest 12 travel, typically, under the influence of gravity, along a vertically, downwardly disposed path of travel 24. As will be appreciated a chute (not shown) could be employed to support the movement of the objects of interest as they individually move along the path of travel under the influence of gravity. The path of travel of the product stream 11, as seen in FIG. 1, includes a first portion where the objects of interest are physically supported on the conveyor assembly 20 or an accompanying chute (not shown); and a second, unsupported, and substantially vertically oriented portion 25 as seen in FIG. 1. The path of travel 24, having the path portion which is unsupported 25, permits the viewing of the various sides 14 of each of the objects of interest 12, and which are moving along in the product stream 11. In the present invention, the method 10 includes another step of providing an inspection station 26, and orienting the inspection station 26 so that the product stream 11 moving along the predetermined path of travel 24 passes through the inspection station 26. The step of providing the inspection station is generally indicated (in one instance) by the box labeled 26, in FIG. 1. However, it should be recognized that the inspection station 26, is a general region in which an optical viewing, or sensor detection step may take place of the respective objects of interest 12 traveling in the product stream 11, as the individual objects of interest move along the path of travel 24, and which includes the unsupported path portion 25, during a predetermined inspection step. As seen in FIG. 1, the inspection station may include a region where the objects of interest 12 may be inspected from only one perspective, (such as when the objects of interest 12 are supported on an underlying surface), and only a limited number of surfaces can be seen. In the present methodology the invention includes another step of providing a field of view, and/or line-of-sight 27 relative to the product stream 11, and which is passing through the inspection station 26. The field of view 27 is best understood, and appreciated, by a study of FIG. 2, and where the field of view is also identified by the abbreviation FOV. As seen in FIG. 1, the arrangement which is generally depicted shows a first inspection station 26, which is oriented so as to permit the imaging of the individual objects of interest 12 which are supported on, and transported by the conveyor assembly 20, as well as a second, inspection station which is located elevationally, below, the conveyor 20, and which allows the inspection of the objects of interest 12 as they move in the unsupported portion of the product stream 25. This arrangement as seen in FIG. 1 permits the present methodology to inspect the various sides 14 of the respective objects of interest 12.

Referring again to FIG. 1, the methodology 10 of the present invention includes a step of providing a plurality of selectively energizable electromagnetic radiation emitters which are generally indicated by the numeral 30. The respective emitters 30, when selectively energized, emit predetermined beams 31 of visible or invisible electromagnetic radiation which are individually oriented, or otherwise directed towards the inspection station 26, and along the FOV and/line-of-sight 27. As seen in the drawings, the selectively energizable electromagnetic radiation emitters 30 may utilize a traditional optical focusing element 32, and which allows the formation of the predetermined, given beams 31, and which are precisely directed at, and along, the predetermined field of view and/or line-of-sight 27. As seen in the drawings, electrical conduits 33 are provided, and which permit or facilitate the selective energizing of the respective electromagnetic radiation emitters 30. Still further, and as seen in FIG. 1, the present methodology includes a step of providing a selectively energizable background element 34 which can be selectively energized so as to provide, or generate, a predetermined visible and/or invisible, background optical signal 35, and which will be useful in the formation of images, and the recognition of defects in the objects of interest 12 as seen in these subsequently produced images. These several aspects of the current methodology will be described in greater detail, hereinafter.

The methodology of the present invention 10 further includes a step of providing a plurality of detection devices 40, and positioning the respective detection devices which are here indicated as first, second and third devices 41, 42 and 43, respectively, at different perspectives or spatial positions, 44, relative to the inspection station 26, and the product stream 11 which is passing through the inspection station 26. The plurality of detection devices 40 are further located in a given, known position, and further, each of the respective detection devices 41, 42 and 43 are oriented so as to share, at least in part, a predetermined field of view 27 relative to at least one of the path portions 24 or 25 of the product stream 11. For example, and not by way of limitation, in some preferred embodiments, two different detection devices, each with a known position different from one another, are configured to provide respective predetermined fields of view, different from one another, while, at the same time, a portion of each of the different fields of view is shared with or common to both. The portions of the two different fields of view of the two different detection devices that are shared with or common to both are complementary. The respective detection devices 40, when actuated, generate device signals which are generally indicated by the numeral 46 (FIG. 2), and which is further utilized in the fashion, as described, hereinafter, to enhance the ability for the present methodology 10 to achieve the superior sorting results, and performance, as will be described, hereinafter. Again by way of example, and not by way of limitation, in some preferred embodiments, two or more of the plurality of detection devices are spatially, spectrally, and/or temporally separated from one another. In some other embodiments, each of the plurality of detection devices are spatially, spectrally, and/or temporally separated from every other of the plurality of detection devices.

Figure 2:
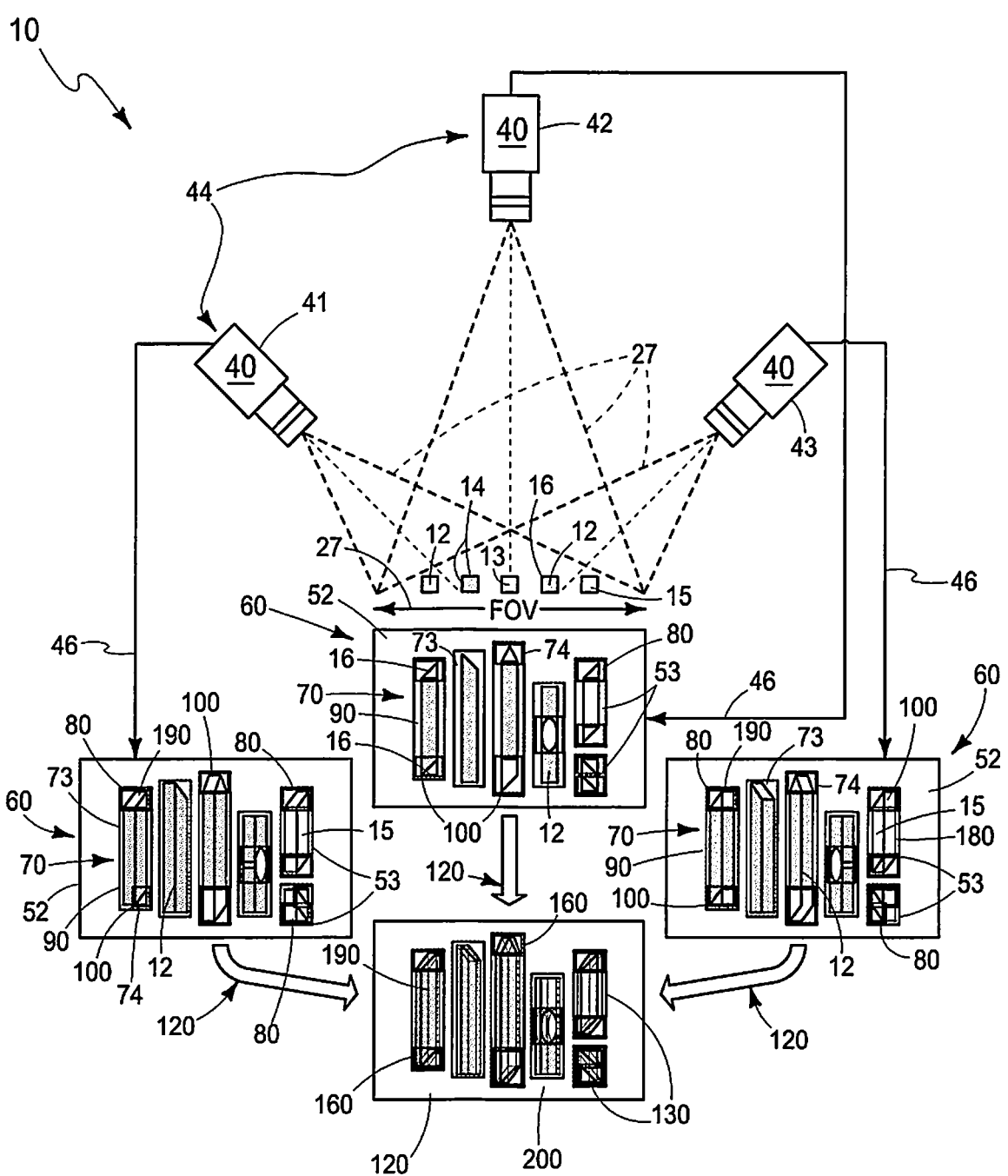
FIG. 2 is a greatly simplified view of an apparatus or other arrangement which can implement at least some of the steps which form the methodology of the present invention.
Figure 3:
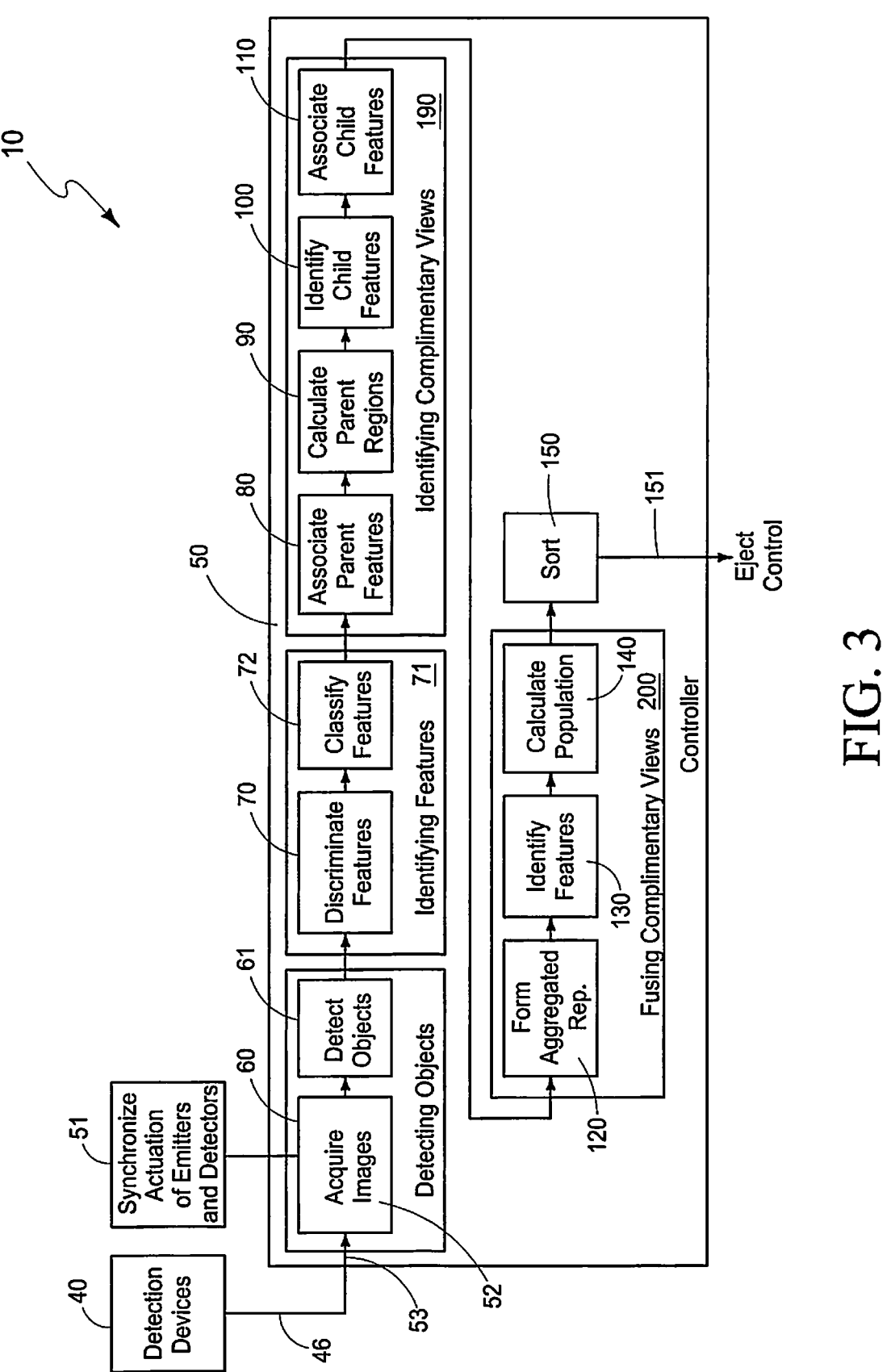
FIG. 3 is a greatly simplified flow diagram which shows at least some of the steps of the present methodology as implemented by the present invention.

The methodology 10 of the present invention includes another step of providing a controller 50 for selectively actuating 51 the respective detection devices 40 in a predetermined order, and in real-time, so as to selectively synchronize the operation of the respective detection devices 40, discussed, above (FIG. 3). Still further, the step of selectively actuating the respective detection devices 41, 42 and 43, with the controller 50, in real-time, so as to enhance the operation of the respective detection devices 40 which are actuated, by avoiding, for example, a destructive interference which might occur if the respective detectors 40 were operated substantially, simultaneously. This destructive interference is discussed in the aforementioned US Patent. The method of sorting 10, further includes still another step 52, of generating multiple images (FIG. 2), each having different perspectives or angular orientations of the respective objects of interest 12 having detectible feature aspects 15, and 16, respectively. In this regard, the device signals 46 (FIG. 2) which are generated by the plurality of detection devices 40 comprise, at least in part, the individual images having multiple, different perspectives 52, of each of the objects of interest 12, and which are moving along the product stream 11. The methodology of the present invention 10 includes still another step 53 (FIG. 3) of delivering the respective device signals to the controller 50 (FIG. 3), for further processing. As seen in FIG. 3, the controller 50 implements a further step 60 of acquiring multiple, different perspective images 52 relative to a given, and predetermined background signal 35, and detecting 61 the respective objects of interest 12 relative to the background signal 35 which is recognized, and present within each of the perspective images which have been acquired 52 from the selectively actuated, and synchronized detection devices 40.

As shown in FIG. 2, each of the different perspective images of the product stream of the plurality individual objects of interest 12 generated from the device signals 46 show slightly different perspective images of each of the product stream and individual objects of interest 12 in the path of travel 25. However, because the positon of each of the selectively actuated detection devices 40 is known relative to the path of travel 25, relative to the field of view 27 and/or relative to the background 34, each of the different perspective images has a portion of the image that is complementary, shared with, or common to at least one of the other different perspective images, so that the different perspective images may be fused together by the controller 50. For example, and not by way of limitation, in some preferred embodiments, two different images, each with a perspective different from one another, while, at the same time, a portion of each of the two different images is shared with or common to both. The portions of the two different images that are shared with or common to both are complementary. The complementary, shared, or common portions of each of the images allow the multiple, different perspective images to be fused together to form a greater whole with a better representation of the product stream and each of the individual objects of interest. The slightly different perspective images of the path of travel 25 permit each of the individual objects of interest 12 to be separately identified as a parent feature 73 which has a main body 13 and side portions 14, and further for each of the identified parent features 73 to be inspected for child features 74 which may be present and may be unacceptable feature aspects 16. The child feature 74, if present, is a feature aspect of, a portion of, or characteristic of the respective parent feature 73 which may require the parent feature 73 (the individual object of interest 12) to undergo further processing, which may be rejection if the child feature 74 is deemed an unacceptable feature aspect 16.

Still referring to FIG. 3 the methodology of the present invention 10 includes a step 70 of discriminating a feature aspect 15, and/or 16 of the individual objects of interest 12 from within each of the different, perspective images 52 which have been acquired 60. The methodology 10 includes, still another step 72, of classifying the respective feature aspects of the individual objects of interest 12 into either a parent 73, or a child 74 feature and/or class (FIG. 2), from each of the different perspective images 52 which have been acquired 60. In addition to the foregoing, the methodology includes still another step 80 of associating a set of parent features 73 which were derived from the different and acquired, perspective images 52 which have been acquired in the step 60, based, at least in part, upon one or more of a group of factors selected from the group comprising the individual object of interest's 12 position; size; shape; orientation; and classification within each of the different perspective images 52 which have been acquired 60. Still further the method 10 includes another step 90 (FIG. 3) of calculating a given region within which to set a bound, boundary, bounding box 180 (FIG. 2) and/or contour surface surrounding the identified parent features 73, and which is based, at least in part, upon one or more of a group of factors selected from the group comprising the size; the shape; and the orientation of the individual parent features 73. The methodology includes still another step 100, of identifying one or more child features 74, of each parent feature 73, and which is identified within the given region that was defined in step 90, above. The method includes yet another step 110 of associating one or more child features or sets of child features 74 within each given region identified in step 90, above, and which is identified, based, at least in part, upon one or more of a group of factors comprising the location of one or more of the child features within the given region 90; the size of one or more of the child features; and the classification of one or more of the child features.

The step 120 of forming, with the controller 50, in real time, a plurality of multiple-aspect aggregated region representations 160 of the individual objects of interest 12 which are traveling in the production steam 11 is accomplished by means of utilizing, at least a portion, of the device signals 46, and which are further generated by each of the detection devices 40 (FIGS. 2 and 3). In this step, 120, the respective multiple-aspect aggregated region representations 160 each have a plurality of features 15 and/or 16, respectively, and which are classified as parent 73 and/or child features 74 within each of the aggregated region representations. Each aggregated region representation further depicts a multitude of characteristics (which may be considered, for example, physical structures or regions; chemical or biological compounds; visually discernible features, or aspects; and/or humanly invisible features or aspects) possessed by each of the objects of interest 12. The method 10 includes still another step 130, of identifying within each of the aggregated region representations 120, all parent and/or child features (73 and 74), and feature sets formed from same. The method 10 includes still another step 140, of calculating a population of the objects of interest 12 by associating the parent and child object features 73 and 74, which were previously identified. Finally, the methodology 10 of the present invention 10 includes a step 150 of sorting the individual objects of interest 12, based, at least in part, upon the aggregated region representations 120, which are formed of the multiple perspective views or images 52, of each of the objects of interest 12, and the multiple aspect region representations 120, which are formed by the controller 50, in real-time, as the individual objects of interest 12 move along in the product stream 11, and through the inspection station 12.

Figure 4:
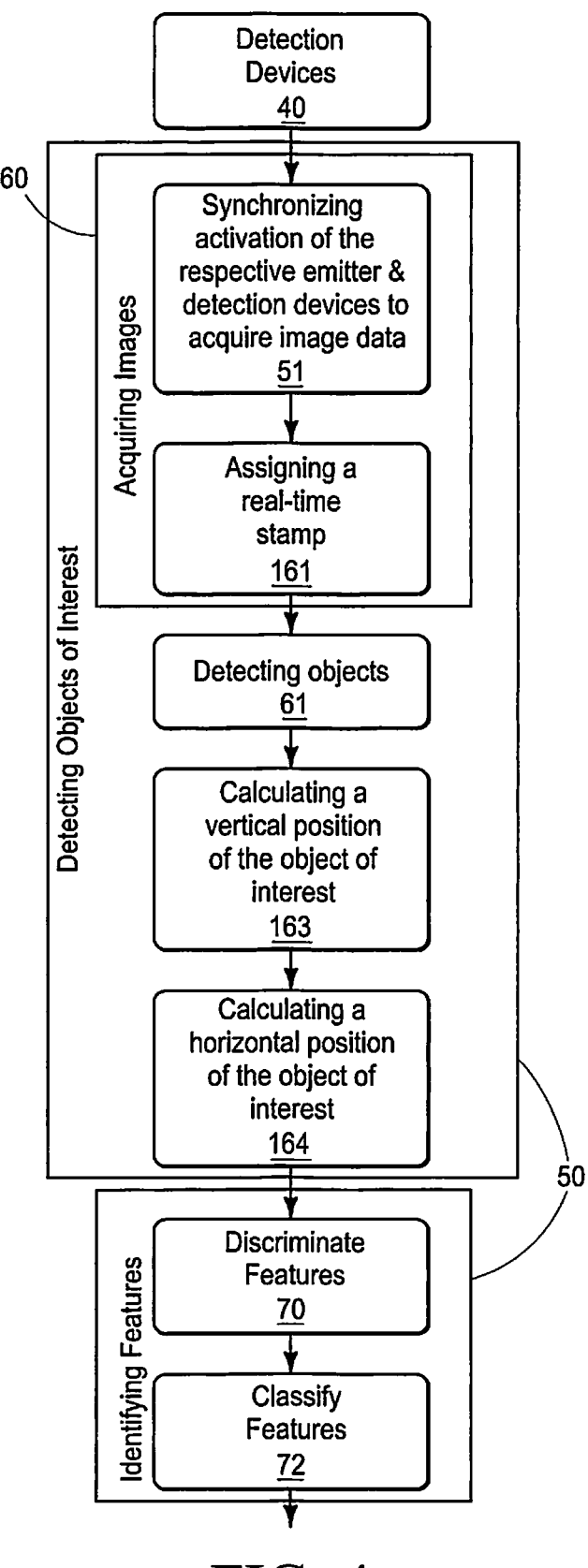
FIG. 4 is a greatly simplified, partial, flow diagram which illustrates at least some of the steps in the methodology of the present invention as seen in FIG. 3.

The method of the present invention includes yet another step (FIG. 4), which is performed after the step of actuating 51 the respective detection devices 40, and acquiring the multiple perspective images 52, of assigning a real-time, time stamp 162, to each of the individual images which are formed by the detection devices 40 having the multiple different perspectives 52. Further, after the step of assigning the real-time time stamp 162, and detecting the objects of interest 12 relative to a known background signal 62; the method includes another step of calculating 163 a vertical position of the respective objects of interest 12 relative to the individual detection devices 40, by utilizing the real-time, time stamp. The method includes still another step 164 of calculating the horizontal position of the respective objects of interest 12 in each of the images generated by the respective detection devices 52, by employing the known position of the respective detection devices 40.

OPERATION

The operation of the described methodology for implementing the present invention 10 is believed to be readily apparent, and is briefly summarized at this point.

In its broadest aspect the method of sorting 10 of the present invention includes the steps of providing a product stream 11, formed of individual objects of interest 12, and each having one or more feature aspects 15 and/or 16 which can be detected. The invention 10 includes another step of generating multiple images each having different perspectives 52, of the respective objects of interest 12, and which include the detectible feature aspects 15, 16, 73 or 74. The method 10 includes another step 72 of classifying the respective feature aspects 15 and/or 16 of each of the objects of interest 12, as being either a parent 73 or a child feature 74. The method 10 includes yet another step of identifying complementary regions or views 190 of the respective objects of interest 12 by analyzing at least some of the previously identified parent and child features 73, and 74, respectively, and which are identified in some of the multiplicity of images 52. The method of the present invention 10 includes still another step 200 of fusing the complementary regions or views 190 which are identified so as to form in step 120 a resulting aggregated region representation 160 of the multiple, complementary regions or views 190. Finally, the methodology 10, in its broadest aspect, includes a step 150 (FIG. 1) of sorting the respective objects of interest 12 based, at least in part, upon the aggregated region representations 120 which are formed by means of the steps which are broadly recited, above.

Therefore it will be seen that the present invention 10 provides a convenient means whereby accurate sorting 150, of a stream of products 11, and which are formed of multiple objects of interest 12, can take place, and defects 16 can be readily identified in the respective objects of interest 12, while minimizing, to the extent possible, a misidentification and/or erroneous quantification of the defects in the respective objects of interest 12 which are being sorted, and which might be occasioned by the same defect 16 being seen, and identified in the respective objects of interest 12, by more than one detection device 40 which is employed to inspect the product stream 11.

In compliance with the statute the invention has been described in language more or less specific as to structural and methodological features. It should be understood, however, that the invention is not limited to the specific features shown and described since the means herein disclosed comprise preferred forms of putting the invention into effect. The invention is, therefore, claimed in any of its forms or modifications within the proper scope of the appended Claims appropriately interpreted in accordance with the Doctrine of Equivalence.

We claim:

1. An inspecting and sorting apparatus comprising:

a product stream formed of a plurality of individual objects of interest each having at least one feature aspect which can be detected and the product stream is passed along a predetermined path;

a plurality of detection devices, each of the plurality of detection devices is positioned at a known position relative to the predetermined path, each of the detection devices are capable of being actuated and when actuated, each of the detection devices generate a device signal, and the known position of each of the plurality of detection devices being different from the known position of every other of the plurality of detection devices, and wherein the known position of each of the plurality of detection devices, relative to the predetermined path, provides a known, and different from every other of the plurality of detection devices, perspective field of view of the predetermined path, and wherein a portion of each known, perspective field of view of each of the plurality of detection devices, is shared with at least one other known, perspective field of view of another of the plurality of detection devices;

multiple images of the product stream are generated using the device signals, each of the generated multiple images having different angular views of the respective objects of interest having the detectable feature aspect and an identifier signal is assigned to each of the generated multiple images;

each feature aspect of each of the individual objects of interest is classified as being either a parent feature or a child feature;

a complementary region of each of the generated multiple images of the respective individual objects of interest is identified by analyzing at least some of the previously classified parent features or child features identified in the generated multiple images;

some of the generated images are fused together using the identified complementary regions of the generated multiple images and using the assigned identifier signals so as to form a resulting aggregated region representation of individual objects of interest; and

the respective individual objects of interest in the product stream are sorted based, at least in part, upon the aggregated region representation.

2. The apparatus as claimed in claim 1, wherein when each feature aspect of each of the objects of interest is classified as being either a parent or a child feature, the classification is based on spectral classification and one or more of the feature's position, size, shape and orientation.

3. The apparatus as claimed in claim 1, wherein each of the respective individual objects of interest in the individual images is detected by means of a known background signal which is detected in each of the images which are generated.

4. The apparatus as claimed in claim 1, further comprising:

a controller configured to selectively actuate the plurality of detection devices in a predetermined order, and in real-time, so as to selectively synchronize the actuation of the plurality of detection devices.

5. The apparatus as claimed in claim 4, wherein the controller establishes a given region which is formed around each of the objects of interest which are seen in the multiple images formed by each of the respective detection devices; and the controller assigns an absolute position to the given region by utilizing calculated positions of the individual objects of interest.

6. The apparatus as claimed in claim 4, wherein the respective plurality of detection devices are selectively actuated to generate the multiple different perspective images from the generated device signals and a real-time time-stamp is assigned by the controller to each of the multiple different perspective images which are formed by the plurality of device signals received from the selectively actuated detection devices; and each of the multiple individual objects of interest are detected by the plurality of detection devices relative to a background, and a vertical position and a horizontal position of each of the multiple individual objects of interest is calculated relative to the plurality of actuated detection devices by utilizing the real-time time-stamp and by employing the known position of the respective detection device.

7. A method of sorting, comprising:

providing a product stream formed of individual objects of interest, each having at least one feature aspect which can be detected;

providing a plurality of detection devices, which when actuated, each generate a device signal, and positioning each of the plurality of detection devices at a known position relative to the product stream, and the known position of each of the plurality of detection devices being different from the known position of every other of the plurality of detection devices, and wherein the known position of each of the plurality of detection devices provides a known, and different from every other of the plurality of detection devices, perspective field of view of the product stream, and wherein a portion of each known, perspective field of view of each of the plurality of detection devices, is shared with at least one other known, perspective field of view of another of the plurality of detection devices;

generating multiple images of the product stream using the device signals, each image having different angular views of the respective objects of interest having the detectable feature aspect, and assigning an identifier signal to each image;

classifying each feature aspect of each of the objects of interest as being either a parent or a child feature;

identifying a complementary region of the images of the respective objects of interest by analyzing at least some of the previously classified parent or child features classified in some of the multiplicity of images;

fusing the complementary regions of the images using the assigned identifier signals so as to form a resulting aggregated region representation of each of the objects of interest; and sorting the respective objects of interest based, at least in part, upon the aggregated region representation which is formed.

8. The method as claimed in claim 7, wherein the step of classifying each feature aspect of each of the objects of interest as being either a parent or a child feature is based on spectral classification and one or more of the feature's position, size, shape and orientation.

9. The method as claimed in claim 7, and wherein the step of generating multiple images further comprises:

providing a controller for selectively actuating the respective detection devices in a predetermined order.

10. The method as claimed in claim 7, and further comprising:

detecting each of the respective objects of interest in the individual images by means of a known background signal which is detected in each of the images which are generated.

11. The method as claimed in claim 7, and after the step of assigning the identifier signal, the method further comprises:

calculating a vertical position of the respective objects of interest, relative to the individual detection devices, by utilizing the identifier signal; and calculating the horizontal position of the respective objects of interest, in each of the images generated by the respective detection devices, by employing a known position of the respective detection devices.

12. The method as claimed in claim 11, and further comprising:

establishing, by means of the controller, a given region which is formed around each of the objects of interest, and which are seen in the multiple images formed by each of the respective detection devices; and assigning an absolute position to the given region by utilizing the calculated vertical and horizontal positions of the individual objects of interest.

13. The method as claimed in claim 12, and further comprising:

calculating the given region surrounding each of the parent features based, at least in part, upon one or more of a group of factors selected from the group comprising a size; a shape; and an orientation of the parent feature; and identifying, if present, at least one child feature, of each parent feature, within each given region.

14. A method of inspecting and sorting, the method comprising:

providing a product stream formed of a plurality of individual objects of interest, each individual object of interest having at least one feature aspect which can be detected;

providing a plurality of detection devices, which when actuated, each generate a device signal, and positioning each of the plurality of detection devices at a known position relative to the product stream, and the known position of each of the plurality of detection devices being different from the known position of every other of the plurality of detection devices, and wherein the known position of each of the plurality of detection devices provides a known, and different from every other of the plurality of detection devices, perspective field of view of the product stream, and wherein a portion of each known, perspective field of view of each of the plurality of detection devices, is shared with at least one other known, perspective field of view of another of the plurality of detection devices;

using the device signals, generating multiple images of the product stream formed of the plurality of individual objects of interest, each of the generated multiple images having a different angular view of the product stream and the respective individual objects of interest having at least one detectable feature aspect, and assigning an identifier signal to each of the generated multiple images;

identifying and classifying each detectable feature aspect of each of the individual objects of interest in the generated multiple images formed from the device signals as a parent feature or a child feature;

analyzing at least some of the identified and classified parent features or the identified and classified child features identified in the generated multiple images to identify a complementary region which comprises a portion of at least one of the plurality of known and different perspective fields of view that is shared with at least one other of the plurality of known and different perspective fields of view of the generated multiple images;

selectively actuating the respective plurality of detection devices, and generating the multiple different perspective images from the generated device signals and assigning the identifier signal to each of the multiple different perspective images which are formed by the plurality of device signals received from the selectively actuated detection devices;

fusing image features together using the identified complementary regions of the generated multiple images, and using the assigned identifier signals, to form a resulting aggregated region representation of each individual object of interest; and sorting the respective individual objects of interest in the product stream based, at least in part, upon the aggregated region representation.

15. The method as claimed in claim 14, wherein each parent feature is associated with a single, individual object of interest.

16. The method as claimed in claim 14, wherein each child feature is associated with a detectable feature aspect of a parent feature.

17. The method as claimed in claim 14, wherein the step of fusing the image features together, further comprises using the assigned identifier signals to form a resulting aggregated region representation of each child feature aspect of each individual object of interest.

18. The method as claimed in claim 14, wherein two or more of the device signals used to generate the multiple images that include complementary regions used to fuse image features together to form a resulting aggregated region representation of each individual object of interest are temporally, spectrally, or spatially separated from each other.

19. The method as claimed in claim 14, and further comprising:

detecting each of the respective individual objects of interest in the individual images by means of a known background signal which is detected in each of the images which are generated.

20. The method as claimed in claim 14, and further comprising the step:

preparing sorting statistics for the respective objects of interest in the product stream by collection of the parent features and child features identified from the multiple images which were generated of the product stream formed of the plurality of individual objects of interest.

* * * * *